(12) United States Patent
Hoffman et al.

(10) Patent No.: US 12,477,978 B2
(45) Date of Patent: Nov. 25, 2025

(54) POWER TOOL AND ACCESSORY MOUNT DEVICE

(71) Applicant: Techtronic Cordless GP, Anderson, SC (US)

(72) Inventors: Ronald J. Hoffman, Iva, SC (US); Christopher A. Holman, Clemson, SC (US)

(73) Assignee: Techtronic Cordless GP, Anderson, SC (US)

( * ) Notice: Subject to any disclaimer, the term of this patent is extended or adjusted under 35 U.S.C. 154(b) by 250 days.

(21) Appl. No.: 17/983,871

(22) Filed: Nov. 9, 2022

(65) Prior Publication Data
US 2023/0292658 A1 Sep. 21, 2023

Related U.S. Application Data

(60) Provisional application No. 63/321,162, filed on Mar. 18, 2022.

(51) Int. Cl.
*A01D 34/416* (2006.01)

(52) U.S. Cl.
CPC ................. *A01D 34/4165* (2013.01)

(58) Field of Classification Search
CPC .................................................. A01D 34/4165
See application file for complete search history.

(56) References Cited

U.S. PATENT DOCUMENTS

| | | | |
|---|---|---|---|
| 4,245,454 A | 1/1981 | Zien | |
| 6,779,274 B2 | 8/2004 | Peterson et al. | |
| 6,901,667 B2 | 6/2005 | Proulx | |
| 6,952,877 B2 | 10/2005 | Pfaltzgraff | |
| 7,275,324 B2 | 10/2007 | Proulx | |
| 7,513,046 B2 | 4/2009 | Proulx | |
| 7,581,322 B2 | 9/2009 | Proulx | |
| D653,920 S | 2/2012 | Cigarini | |
| 8,689,451 B2 | 4/2014 | Cigarini | |
| 9,380,743 B2 | 7/2016 | Alliss | |
| 9,516,807 B2 | 12/2016 | Alliss | |

(Continued)

FOREIGN PATENT DOCUMENTS

| | | |
|---|---|---|
| CA | 2714878 C | 2/2013 |
| CN | 104663113 B | 8/2016 |

(Continued)

OTHER PUBLICATIONS

European Search Report Corresponding to EP23161808 on Jul. 31, 2023.

*Primary Examiner* — Liang Dong
(74) *Attorney, Agent, or Firm* — Dority & Manning, P.A.

(57) ABSTRACT

A power tool and an accessory mount device are provided. The device includes a driven member, a plate, and a flyweight comprising a first flyweight portion configured to translate along the first direction and contact the plate. The flyweight includes a second flyweight portion configured to translate along the second direction. The flyweight is positioned at a hinge between the first flyweight portion and the second flyweight portion and is configured to rotate along the hinge to push the first flyweight portion to the plate and translate the plate and the driven member along the first direction toward the first end when a rotational speed threshold about the first axis is exceeded.

16 Claims, 15 Drawing Sheets

(56) References Cited

U.S. PATENT DOCUMENTS

| | | | |
|---|---|---|---|
| D796,293 S | 9/2017 | Alliss | |
| 9,861,033 B2 | 1/2018 | Skinner et al. | |
| 9,907,225 B2 | 3/2018 | Cigarini et al. | |
| 9,924,631 B2 | 3/2018 | Alliss | |
| 10,034,422 B2 | 7/2018 | Palermo | |
| D825,293 S | 8/2018 | Alliss | |
| 10,130,030 B2 | 11/2018 | Sprungman et al. | |
| 10,149,433 B2 | 12/2018 | Wyne | |
| 10,334,778 B2 | 7/2019 | Kullberg | |
| 10,537,057 B2 | 1/2020 | Sergyeyenko et al. | |
| 10,918,015 B2 | 2/2021 | Hallendorff et al. | |
| 11,109,530 B2 | 9/2021 | Arnetoli | |
| 11,229,160 B2 | 1/2022 | Skinner | |
| 11,337,368 B2 | 5/2022 | Alliss | |
| 11,419,262 B2 | 8/2022 | Guo et al. | |
| 11,439,059 B2 | 9/2022 | Dai | |
| 11,452,258 B2 | 9/2022 | Zhang et al. | |
| D970,321 S | 11/2022 | Alliss | |
| 11,503,759 B2 | 11/2022 | Guo et al. | |
| 11,503,763 B2 | 11/2022 | Holman et al. | |
| 11,582,905 B2 | 2/2023 | Alliss | |
| 2013/0145630 A1 | 6/2013 | Stones | |
| 2014/0325851 A1 | 11/2014 | Bone | |
| 2015/0223395 A1* | 8/2015 | Pellenc | A01D 34/4166 30/276 |
| 2016/0106034 A1 | 4/2016 | Arnetoli | |
| 2017/0231153 A1* | 8/2017 | Hoffman | A01D 34/4163 30/276 |
| 2018/0104809 A1* | 4/2018 | Dyer | B27B 17/0016 |
| 2020/0236845 A1 | 7/2020 | Wang et al. | |
| 2021/0037704 A1 | 2/2021 | Kullberg | |
| 2021/0076564 A1 | 3/2021 | Guo | |
| 2022/0104430 A1 | 4/2022 | Guo | |
| 2022/0104431 A1 | 4/2022 | Guo | |
| 2022/0240445 A1 | 8/2022 | Hoffman et al. | |
| 2022/0330479 A1 | 10/2022 | Cholst et al. | |
| 2022/0377974 A1 | 12/2022 | Hoffman et al. | |
| 2022/0400609 A1 | 12/2022 | Guo et al. | |
| 2023/0000008 A1 | 1/2023 | Cholst | |
| 2023/0011491 A1 | 1/2023 | Levin et al. | |
| 2023/0157205 A1 | 5/2023 | Kullberg et al. | |

FOREIGN PATENT DOCUMENTS

| | | |
|---|---|---|
| CN | 206506877 U | 9/2017 |
| CN | 207022513 U | 2/2018 |
| CN | 207543609 U | 6/2018 |
| CN | 108617226 A | 10/2018 |
| CN | 106416588 B | 8/2019 |
| CN | 111937564 A | 11/2020 |
| CN | 112273035 A | 1/2021 |
| CN | 113179742 A | 7/2021 |
| CN | 115250721 A | 11/2022 |
| CN | 115486257 A | 12/2022 |
| CN | 218125533 U | 12/2022 |
| CN | 218897541 U | 4/2023 |
| CN | 219019570 U | 5/2023 |
| DE | 102007056319 A1 | 5/2009 |
| EP | 2107866 B1 | 6/2012 |
| EP | 2798935 B1 | 3/2018 |
| IT | 201800008009 A1 | 2/2020 |
| WO | WO2015172744 A1 | 11/2015 |
| WO | WO2018/077231 A1 | 5/2018 |
| WO | WO2019/192201 A1 | 10/2019 |
| WO | WO2022/218058 A1 | 10/2022 |

* cited by examiner

POWER TOOL AND ACCESSORY MOUNT DEVICE

PRIORITY STATEMENT

The present application claims the benefit of priority to U.S. Provisional Patent Application Ser. No. 63/321,162, filed on Mar. 18, 2022, the disclosure of which is incorporated by reference herein in its entirety.

FIELD

The present disclosure generally pertains to power tools and accessory mounting devices.

BACKGROUND

Power tools are generally used to perform manual operations without requiring as much manual labor. For example, trimmers are utilized for trimming grass and weeds. Trimmers generally utilize trimmer line which is spun at high speeds to break the grass and weeds. However, the trimmer line is subject to damage over periods of use and may become broken or ineffective. Accordingly, operators must advance new trimmer line as the existing trimmer line becomes exhausted. Traditional assemblies utilize manual advancement or bump feeds which activate release of additional trimmer line when the power tool is bumped against a surface, e.g., the ground. This can cause damage to the power tool and is not a desirable method of advancing trimmer line.

Accordingly, improved trimmers and trimmer heads would be advantageous.

BRIEF DESCRIPTION

Aspects and advantages of the invention will be set forth in part in the following description, or may be understood from the description, or may be learned through practice of the invention.

An aspect of the present disclosure is directed to an accessory mount device for a power tool. The device includes a driven member, a plate, and a flyweight including a first flyweight portion configured to translate along the first direction and contact the plate. The flyweight includes a second flyweight portion configured to translate along the second direction. The flyweight is positioned at a hinge between the first flyweight portion and the second flyweight portion and is configured to rotate along the hinge to push the first flyweight portion to the plate and translate the plate and the driven member along the first direction toward the first end when a rotational speed threshold about the first axis is exceeded.

Another aspect of the present disclosure is directed to a power tool including a power tool housing including a port configured to be electrically connected with a power source, and a trimmer head electrically connected to the power source to rotate the trimmer head. The trimmer head defines a first axis around which the trimmer head is rotatable and a first direction co-directional to the first axis, and a first end and a second end separated along the first axis, and a second direction extending radially from the first axis. The trimmer head includes a driven member, a plate, and a flyweight including a first flyweight portion configured to translate along the first direction and contact the plate. The flyweight includes a second flyweight portion configured to translate along the second direction. The flyweight is positioned at a hinge between the first flyweight portion and the second flyweight portion and is configured to rotate along the hinge to push the first flyweight portion to the plate and translate the plate and the driven member along the first direction toward the first end when a rotational speed threshold about the first axis is exceeded.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 13 depicts a perspective view of an exemplary embodiment of a

Figure 1:
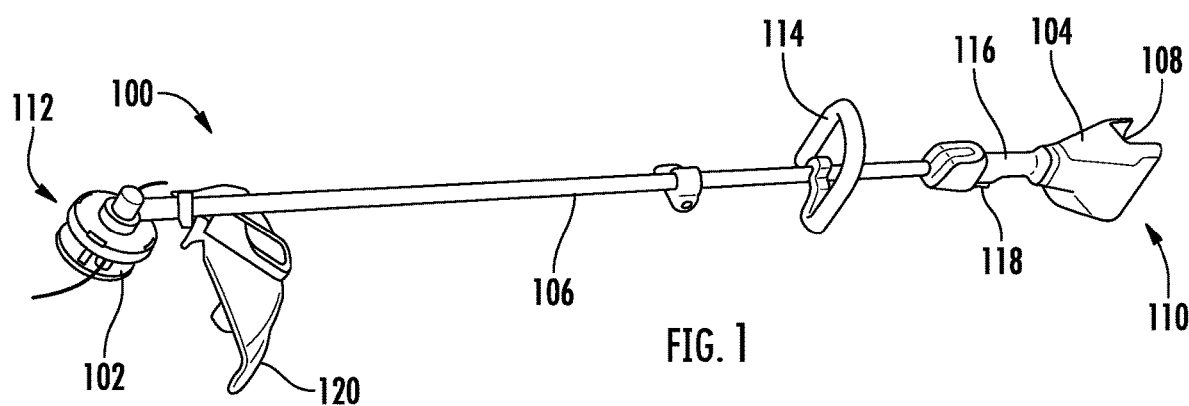
FIG. 1 depicts a perspective view of an exemplary embodiment of a power tool in accordance with aspects of the present disclosure.

Repeat use of reference characters in the present specification and drawings is intended to represent the same or analogous features or elements of the present invention.

DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The present disclosure is generally directed to improved power tools and accessory mount devices, such as trimmers and trimmer heads. Embodiments of trimmers and trimmer heads depicted and described herein such trimmer heads address one or more of the above-identified issues with some known trimmers. Embodiments of power tools such as provided herein may provide structures and methods for feeding trimmer line, structures for mounting a trimmer line spool, and structures and methods such as may mitigate damage to the power tool.

Referring now to the drawings, FIG. 1 illustrates a power tool 100 including a trimmer head 102, a housing 104, and a connecting member 106 extending between the trimmer head 102 and the housing 104. The housing 104 may include a port 108 configured to be electrically connected with a power source, such as a battery (not illustrated) or wall outlet. The port 108 is illustrated as being disposed at a first end 110 of the power tool 100 and the trimmer head 102 is disposed at a second end 112 of the power tool 100. In other embodiments, either one or both of the port 108 or trimmer head 102 can be spaced apart from the first or second end 110 or 112, respectively. In certain instances, the power tool 100 may be electrically powered, e.g., via the battery or through a wall outlet. In other instances, the power tool 100 may be powered by a fuel, such as gasoline or other liquid or gaseous fuel.

A handle 114 can be disposed along the connecting member 106, the housing 104, or another portion of the power tool 100. The handle 114 can allow the operator to support the weight of the power tool 100 during operation. A grip 116 can be disposed along the connecting member 106 to permit a second point of contact for the operator. The grip 116 can include, for example, a portion of the connecting member 106 including a user interface 118. The user interface 118 can include a trigger that allows the operator to selectively control the power tool 100. The user interface 118 can further include other controls which permit the operator to effect change to the power tool 100. For instance, by way of non-limiting example, the user interface 118 may include any one or more of a cruise control feature allowing the operator to maintain the operating speed of the trimmer head 102, a turbo which allows the power tool 100 to reach full operational speed, a power switch having at least ON and OFF functionality, a safety, or any other desirable user controls. As described in greater detail below, the user interface 118 can include a trimmer line advance interface configured to selectively feed trimmer line from the cartridge when actuated. In the illustrated embodiment, the grip 116 and user interface 118 are disposed between the handle 114 and the port 108. In other embodiments, the relative arrangement of the grip 116, user interface 118, handle 114, and port 108 can be adjusted.

In certain embodiments, the power tool 100 can further include a guard 120 configured to protect the operator from debris or projectiles that may be kicked up by the trimmer head 102. In certain instances, the guard 120 can be engaged with the connecting member 106 and be disposed adjacent to the trimmer head 102.

Referring now to FIGS. 2-10, views of embodiments of an accessory mount device 200 are provided. The accessory mount device 200 may form at least a portion of embodiments of the trimmer head 102, such as for embodiments of the power tool 100 depicted and described regarding FIG. 1. Accessories for the device 200 may include a spool 300 (FIG. 3) having a length of wire or line, such as trimmer line, wrapped around the spool, such as described herein. However, it should be appreciated that the accessory mount device 200 may form at least a portion of embodiments of other trimmer heads, line feed devices, or spool retainer devices. Embodiments of the accessory mount device 200 may be utilized with other embodiments of power tools. Accordingly, embodiments of the accessory mount device 200 provided herein may not be limited to embodiments of the power tool 100 depicted and described herein.

Figure 2:
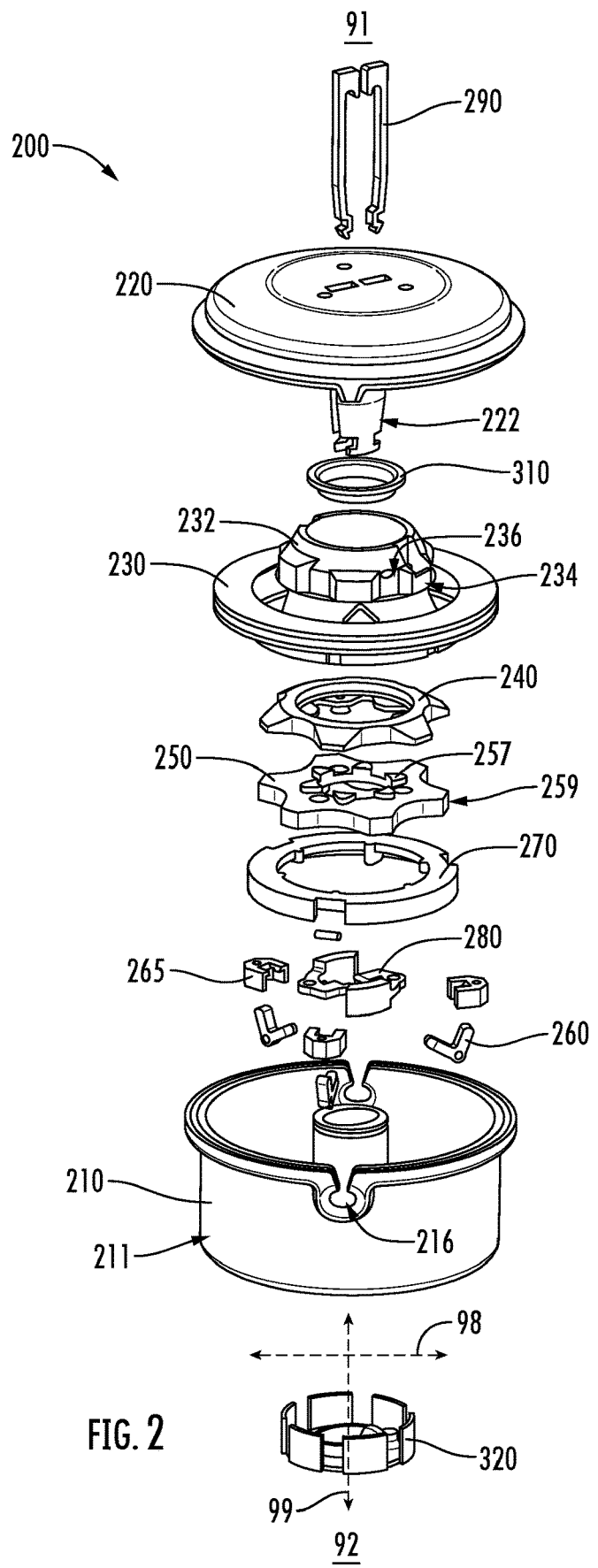
FIG. 2 depicts an exploded view of an exemplary embodiment of an accessory mount device in accordance with aspects of the present disclosure.

FIG. 2 provides an exploded view of an exemplary embodiment of the accessory mount device 200. A reference first axis 99 extends substantially as a centerline through the device 200. A reference first direction extends co-directional to the first axis 99. A reference second direction 98 extends radially from the first axis 99. A reference first end 91 and a reference second end 92 are separated along the first axis 99. The first end 91 may define an upper end and the second end 92 may define a lower end. However, it should be appreciated that the first end and the second end may define laterally spaced ends, transversely spaced end, longitudinally spaced ends, or other appropriate coordinate system.

Figure 3:
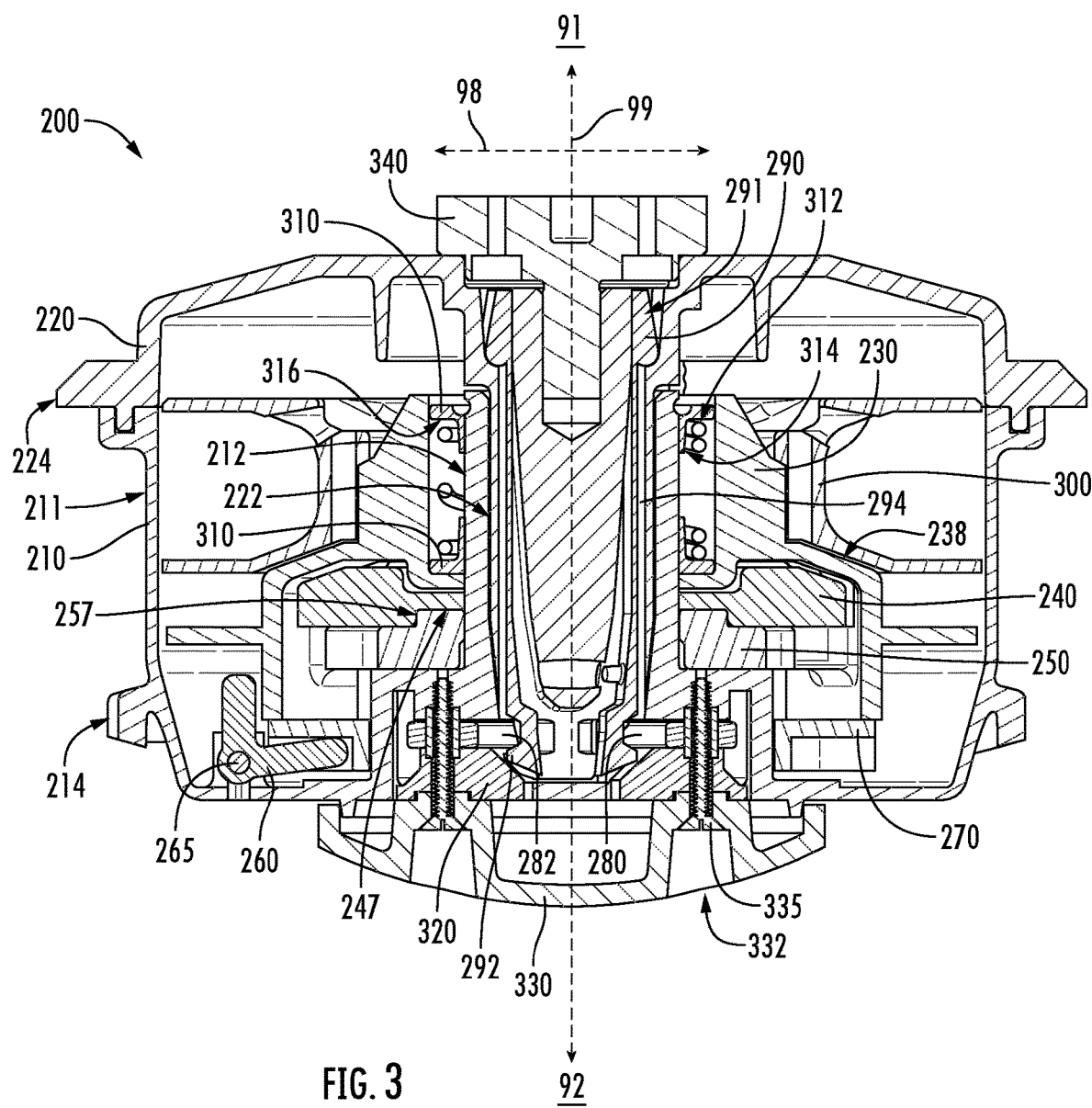
FIG. 3 depicts a cross-sectional side view of an exemplary embodiment of an accessory mount device in accordance with aspects of the present disclosure.
Figure 4:
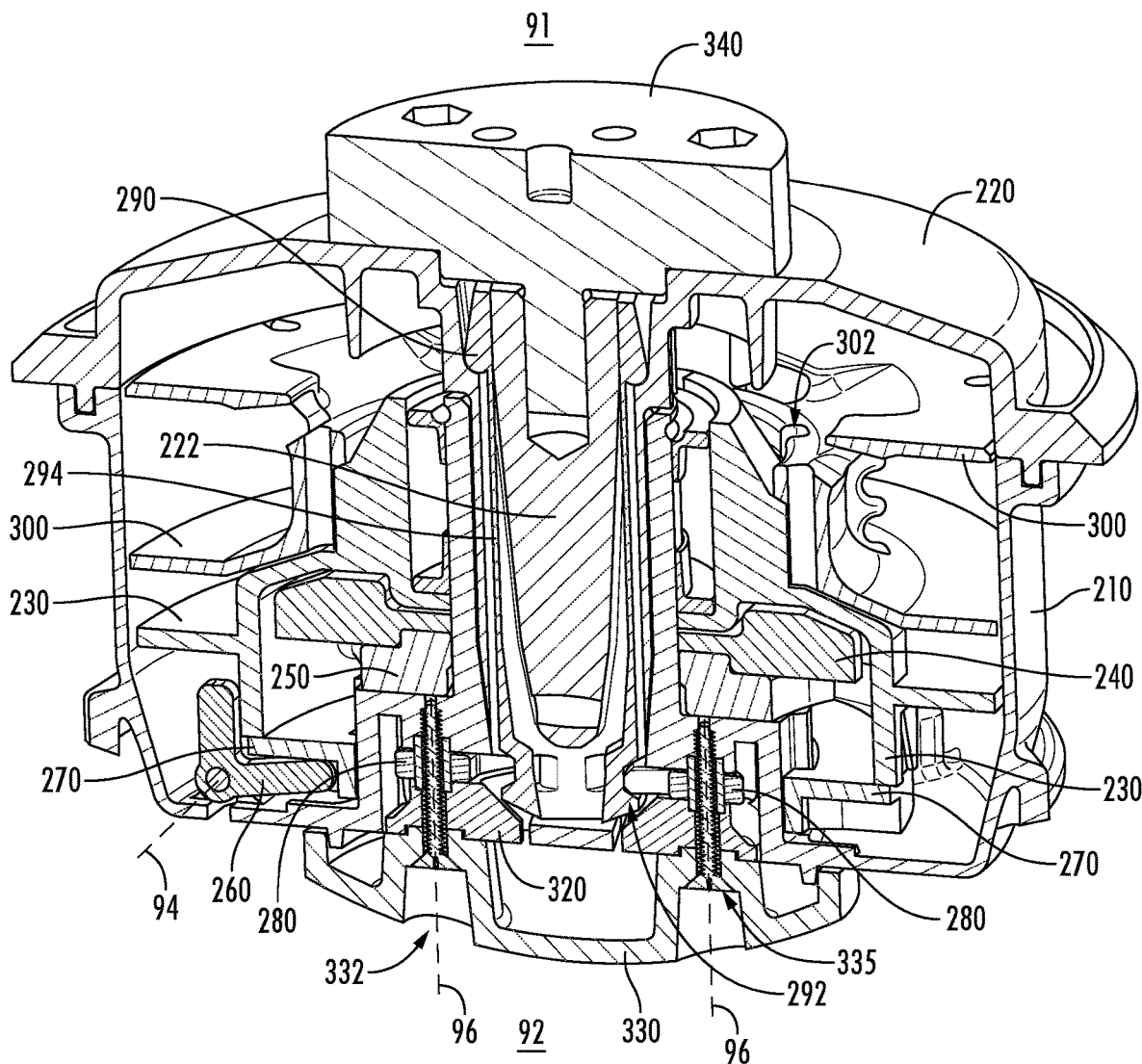
FIG. 4 depicts a cross-sectional perspective view of an exemplary embodiment of the accessory mount device in accordance with aspects of the present disclosure.

FIGS. 3-4 provide cross sectional views of an embodiment of the accessory mount device 200 including an embodiment of a spool 300 (omitted in FIG. 2 for clarity). The spool 300 may form a trimmer line spool configured to retain and release a length of wire or line. A lower or first housing 210 may form an opening 216 through which line may feed from the spool 300 through the opening 216, such as for cutting or trimming during operation of a power tool.

The device 200 includes the lower or first housing 210 and an upper or second housing 220. The housings 210, 220 are connectable together to form a volume into which a lifter assembly and spool 300 (FIGS. 3-7) is positioned. First housing 210 may form a first centerbody 212 extending along the first direction. Second housing 220 may form a second centerbody 222 extending along the direction. Each centerbody 212, 222 may form substantially cylindrical shafts extending around the first axis 99. Embodiments of the first centerbody 212 are substantially hollow, such as to allow the second centerbody 222 to extend into the first centerbody 212 along the first direction.

Figure 5:
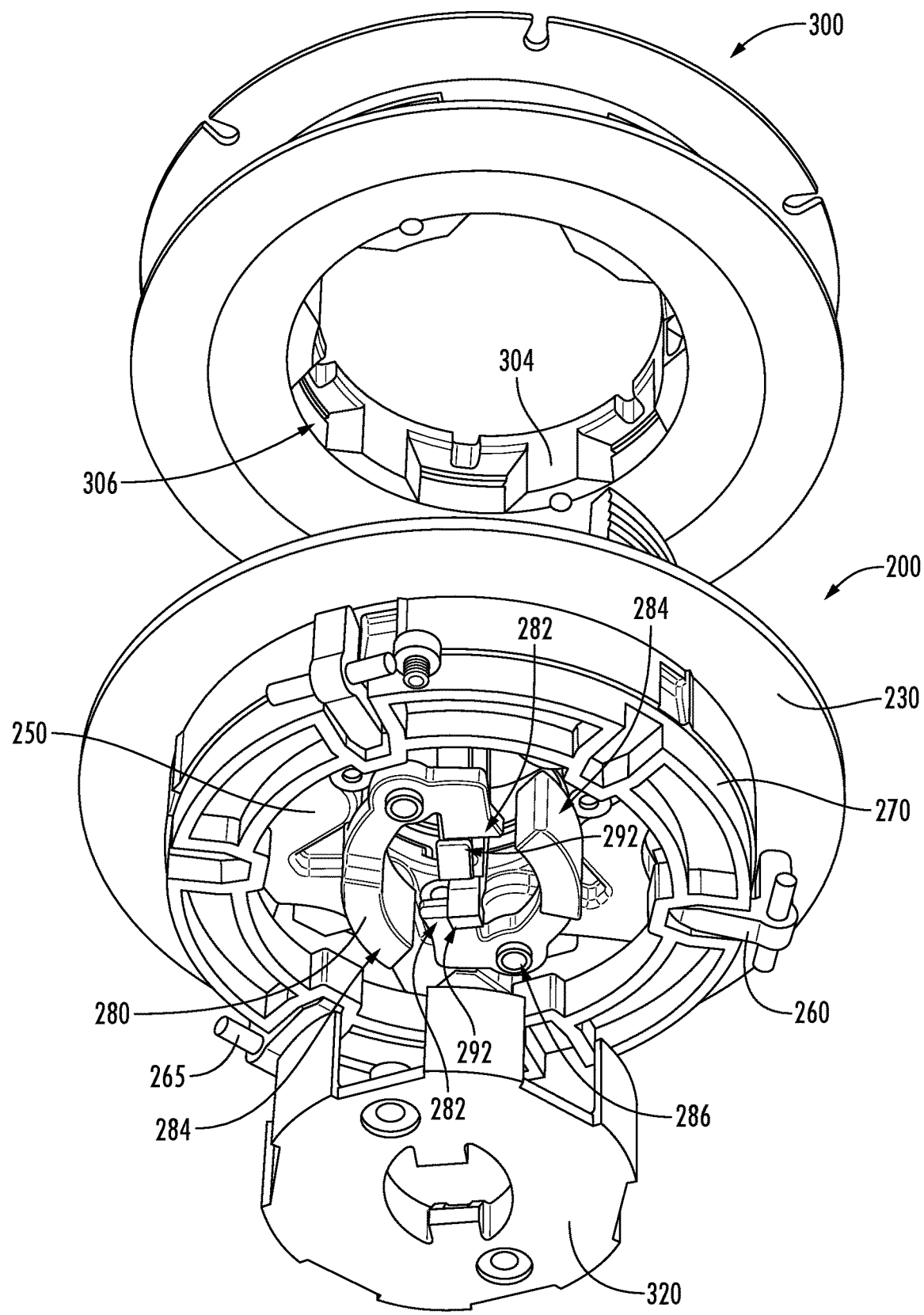
FIG. 5 depicts a partially exploded perspective view of an exemplary embodiment of the accessory mount device in accordance with aspects of the present disclosure.

Referring to FIGS. 3-10, embodiments of the device 200 include a driven member 230. The driven member 230 includes a sleeve 232 extending substantially around the first axis 99. A protrusion 234 extends along the second direction 98 from the sleeve 232, such as to form a groove 236 between two or more protrusions 234. Referring to FIG. 5, the partially exploded view of an exemplary device 200 depicts a protrusion 304 and groove 306 extending from the spool 300. The protrusion 304 and groove 306 at the spool 300 may correspond to the protrusion 234 and groove 236 (FIG. 2) at the driven member 230, such as to allow the driven member 230 and the spool 300 to engage and disengage from one another along the first direction. Referring to FIG. 3, the spool 300 is positioned onto a platform 238 extending substantially along the second direction 98 from the sleeve 232.

Figure 9:
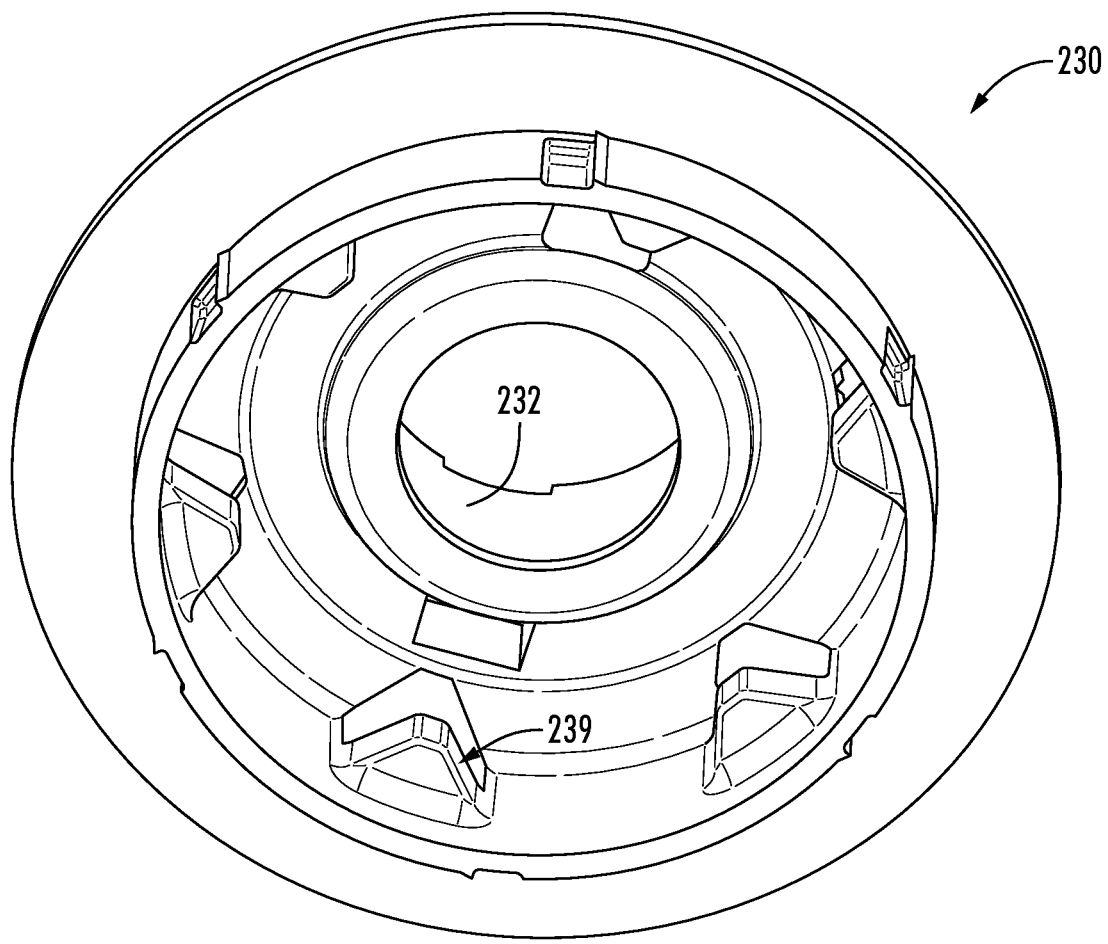
FIG. 9 depicts a perspective view of an exemplary embodiment of a driven member of the accessory mount device in accordance with aspects of the present disclosure.
Figure 10:
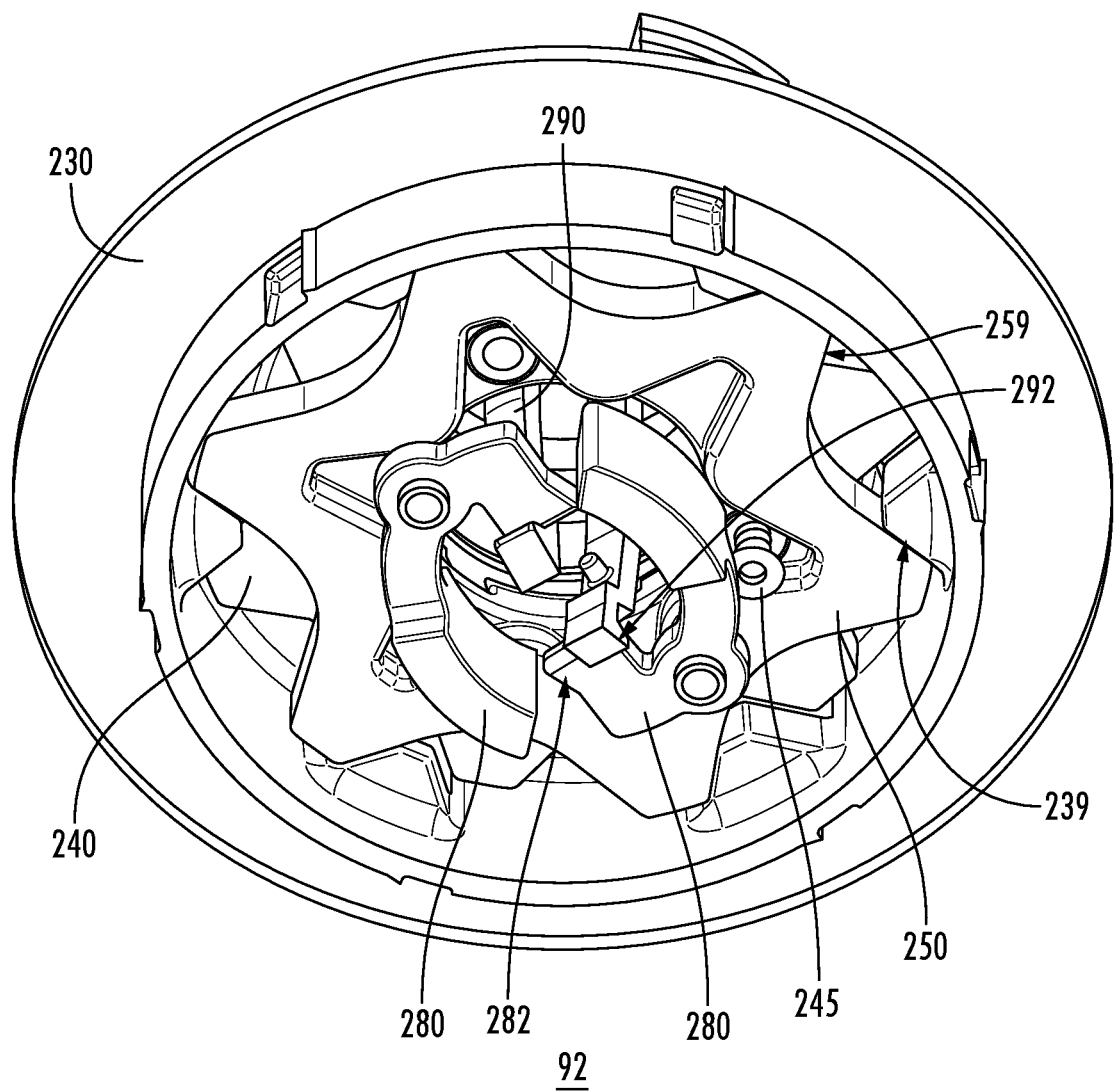
FIG. 10 depicts a perspective view of an exemplary embodiment of the accessory mount device in accordance with aspects of the present disclosure.

Referring to FIGS. 9-10, embodiments of the driven member 230 may include a driven member detent 239. The detent 239 forms a wall extending along the second direction 98 toward the first axis 99. The driven member 230 may include a plurality of driven member detents 239 spaced apart in circumferential arrangement.

Referring to FIGS. 2-10, the lifter assembly pushes the driven member 230 and the spool 300 along the first direction. The lifter assembly may include a lower or first lug 250 and an upper or second lug 240. In some embodiments, the lugs 240, 250 form respectively separable structures, such as to provide improved durability and mitigate fatigue or failure. Lower lug 250 forms lower lug detents 259 extending along the second direction 98. The detents 259 at the lower lug 250 may correspond to detents 239 at the driven member 230 such that rotation of the lower lug 250 causes detents 239, 259 to abut one another. In some embodiments, lower lug 250 may form a substantially star-shaped structure. The lower lug 250 may form detents 259 at points of the star-shaped structure. The separate lugs 240, 250 may allow for larger radii, rounded surfaces, or blends between the lugs 240, 250. The larger blends may reduce stresses where faces join. Additionally, or alternatively, separate lugs 240, 250 may allow for half as many lugs or detents per part, such as to allow for larger blends and lower stresses than unitary structures.

Figure 8:
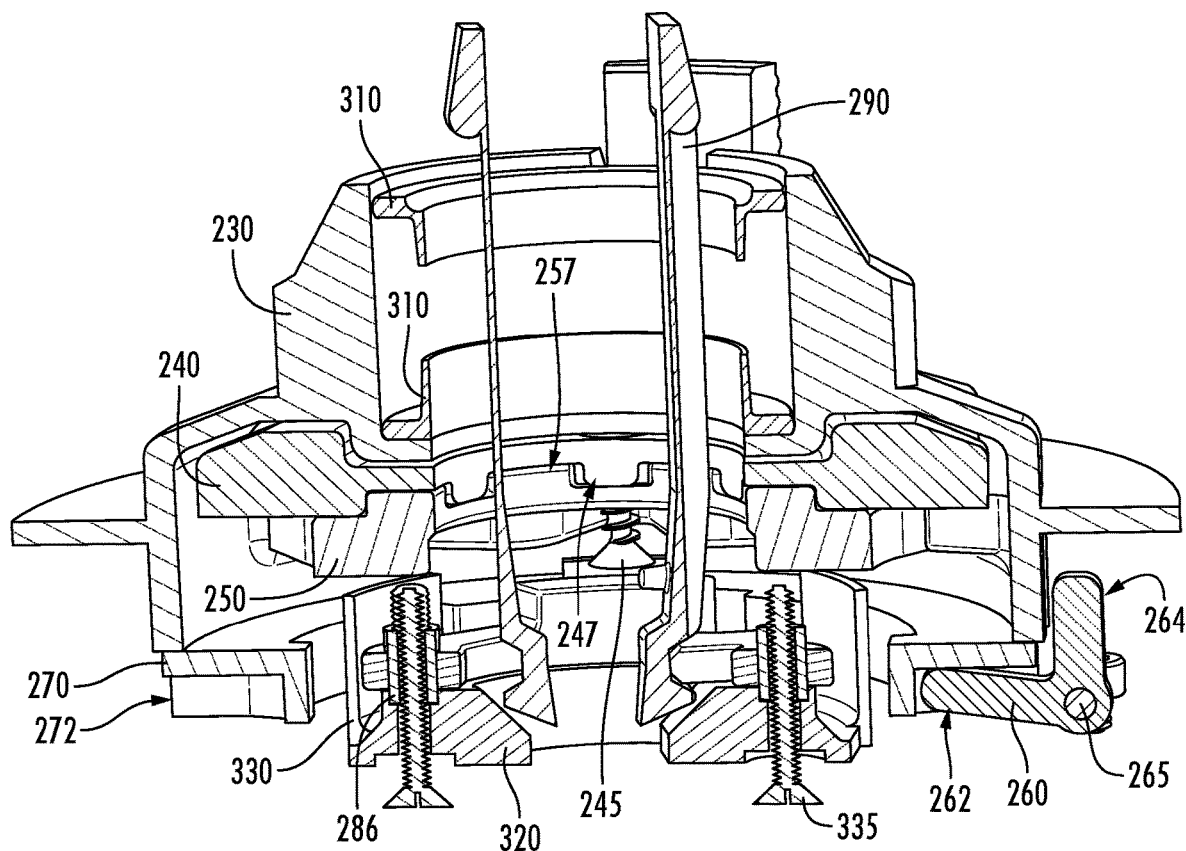
FIG. 8 depicts a cross-sectional perspective view of an exemplary embodiment of the accessory mount device in accordance with aspects of the present disclosure.

Referring to FIGS. 3-4 and FIG. 8, upper lug 240 and lower lug 250 may form corresponding interfaces 247, 257. Interfaces 247, 257 may form interdigitated structures or castellations extending into one another along the first direction. The interfaces 247, 257 at respective lugs 240, 250 drive and stop the driven member 230 and spool 300 when the lugs 240, 250 are lifted and moved to other interfaces 247, 257.

Figure 6:
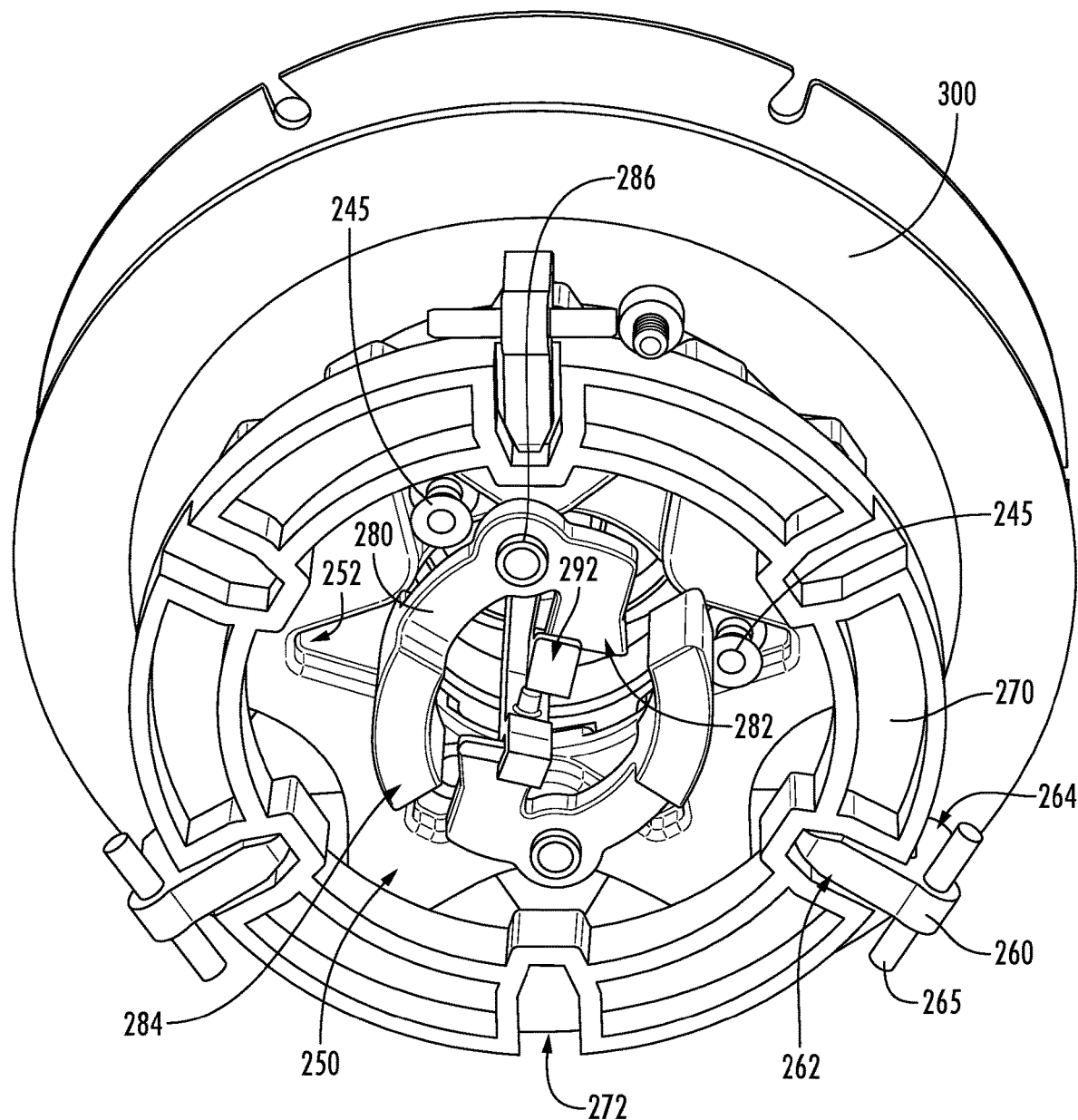
FIG. 6 depicts a perspective view of an exemplary embodiment of the accessory mount device in accordance with aspects of the present disclosure.

In some embodiments, such as depicted in FIG. 6, FIG. 8, and FIG. 10, a fastener or other detent structure 245 may extend from the upper lug 240 toward the second end 98. Referring to FIG. 6, the detent structure 245 is positioned at openings 252 formed at or between detents 259. For instance, openings 252 may be formed at detents 259 forming points of the lower lug 250 forming a star-shaped structure. The detent structure 245 extending from the upper lug 240 accordingly may position the upper lug 240 relative to the lower lug 250 (e.g., clock or position an orientation of the lower lug 250 and the upper lug 240).

Referring to FIGS. 2-7, the device 200 may include a flyweight 260 articulable to contact a plate 270. The plate 270 may form a lifter platform configured to translate along the first direction as the device 200 rotates and changes in rotational speed. In some embodiments, the plate 270 forms a surface extending around the first axis 99 and extending along the second direction 98. In an exemplary method for operation, the flyweight 260 rotates at a hinge 265 extending along an axis of rotation 94 to push the plate 270 along the first direction toward the first end 91. For instance, the flyweight 260 rotates at the hinge 265 to push the plate 270 along the first direction toward the first end 91 as the device 200 increases in rotational speed.

Figure 7:
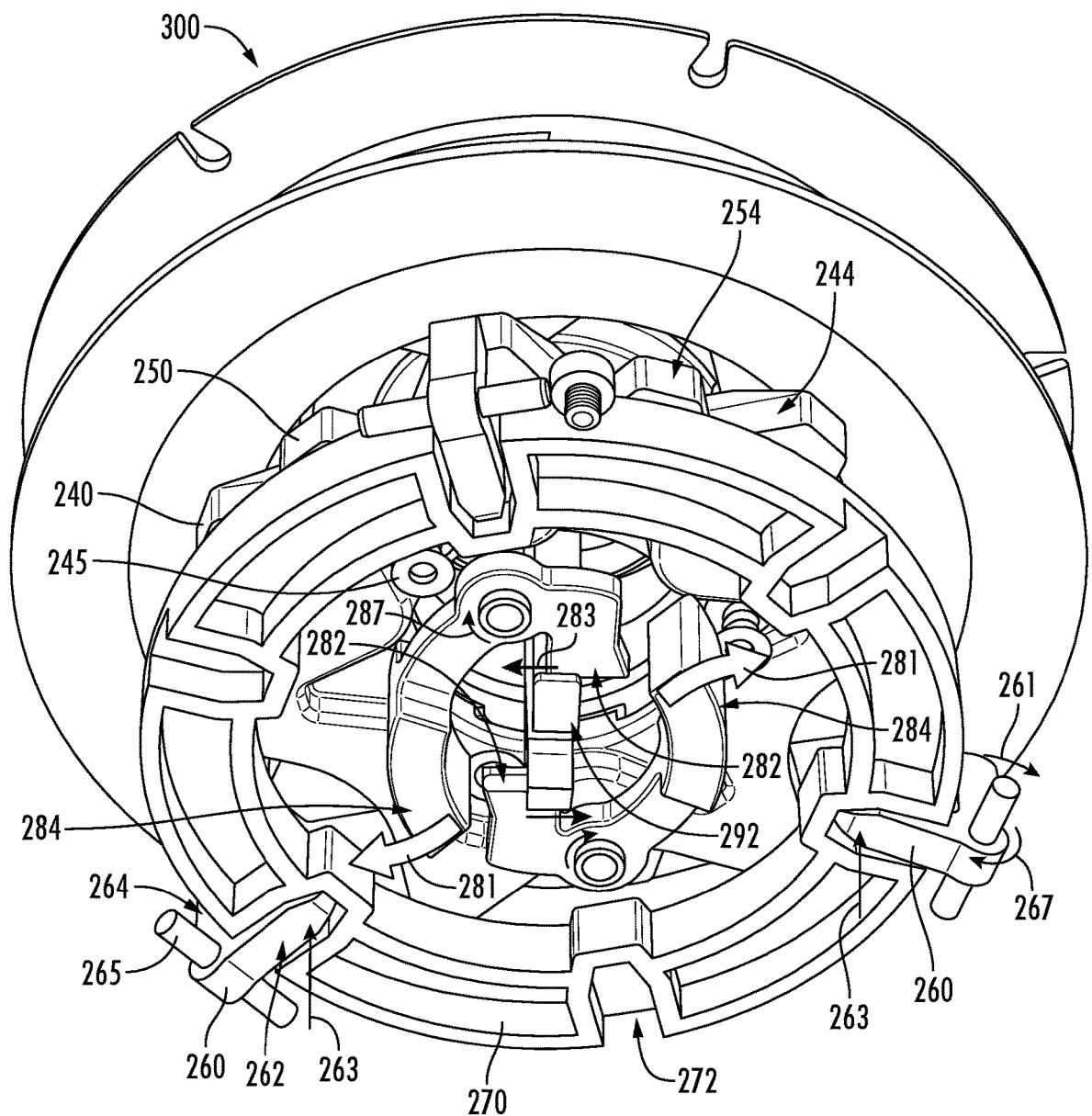
FIG. 7 depicts a perspective view of an exemplary embodiment of the accessory mount device in accordance with aspects of the present disclosure.

In some embodiments, such as depicted in FIGS. 7-8, the flyweight 260 forms a first flyweight portion or first portion 262 at which the flyweight 260 pushes the plate 270 along the first direction. The plate 270 may form a recess 272 configured to receive the first portion 262 of the flyweight 260. The recess 272 may form a contact portion at which the first portion 262 of the flyweight 260 applies a force onto the plate 270, such as further described herein. The flyweight 260 may further form a second flyweight portion or second portion 264. The second portion 264 may include a center of mass positioned above the axis of rotation 94 of the flyweight 260. In some embodiments, the second portion 264 is configured to pull or rotate the flyweight 260 along the axis of rotation 94 along the hinge 265 as the device 200 increases in rotational speed around the first axis 99. At or beyond a threshold rotational speed, centrifugal force at the second portion 264 increases to cause the second portion 264 to translate outward along the second direction 98 (e.g., radially outward from the first axis 99) and rotate the first portion 262 toward the first end 91 (e.g., upward along the first direction) via the hinge 265. Force exerted by the first portion 262 onto the plate 270 causes the plate 270 to translate along the first direction toward the first end 91. For instance, force exerted by the first portion 262 onto the plate 270 causes the plate 270 to translate along the first direction toward the first end 91 at or beyond the threshold rotational speed of the device 200.

In some embodiments, decrease or discontinuation of forces exerted by the first portion 262 onto the plate 270 allows the plate 270 to translate along the first axis toward the second end 92. For instance, decrease or discontinuation of force exerted by the first portion 262 onto the plate 270 allows the plate 270 to translate along the first direction toward the second end 92 when the rotational speed of the device 200 is below the threshold rotational speed (e.g., via gravity). Referring to FIG. 3, in some embodiments, a spring structure 310 is positioned to push or otherwise bias the driven member 230 toward the second end 92. The spring structure 310 may form a plate or platform 316 having a radially extending surface at which a spring 312 may interact along the first axis 99. The spring structure 310 may further include a collar 314 configured to interface to the first centerbody 212 at the first housing 210. The spring 312 may include a coil spring, a leaf spring, or other appropriate spring, or a pressure plate or weight. In an exemplary embodiment, the spring 312 is under load against the springing structure 310. The spring 312 may be configured to include a preload at rest. The spring 312 may further be configured to compress during an operating cycle of a feeding sequence of cutting line from the spool 300. The spring 312 may force the driven member 230 back down (e.g., toward the second end 92) when the rotational speed is below a feeding threshold, such as further described herein. In some embodiments, the spring 312 and springing structure 310 are configured to push or encourage the driven member 230 toward the second end 92 such that the driven member 230 and spool 300 are in a first position corresponding to a first operating range (e.g., non-feeding range). The flyweight 260 is configured to overcome the force from the spring 312 or spring structure 310 when at a second operating range (e.g., line feeding range), such as further described herein.

Referring to FIGS. 3-4, the plate 270 contacts the driven member 230. In some embodiments, the plate 270 selectively contacts the driven member 230. Translation of the plate 270 by the flyweight 260 such as described herein may translate the driven member 230 and spool 300 and allow line coupled to the spool to feed through the opening 216 (FIG. 2) at the first housing 210.

In a method for operation, a first operating range corresponds to a range of speed at which a user cuts or trims (e.g., using line from the spool). A second operating range corresponds to a range of speed at which the flyweight (e.g., flyweight 260) pushes the spool (e.g., spool 300) to allow line to feed through the housing (e.g., through opening 216 of housing 210). In some embodiments, the first operating range and the second operating range are non-overlapping. In still some embodiments, the second operating range is greater than the first operating range. For instance, a user operates the power tool at the first operating range to cut or trim (e.g., cut, or trim grass). The user may command an increase in rotational speed above the first operating range to the second operating range. At or above a threshold rotational speed (e.g., at a lower limit of the second operating range), centrifugal forces at or above a threshold centrifugal force cause the flyweight (e.g., flyweight 260) to rotate and cause line to feed, such as described herein. The user may command a decrease in rotational speed (or cease commanding the increased rotational speed). Below the threshold rotational speed, centrifugal forces have decreased such as to allow the flyweight to rotate back (e.g., toward the first axis 99) and cease or inhibit continued line feed. Decreased or discontinued linear forces allow the spool and driven member (e.g., driven member 230) to translate down (e.g., toward the second end 92).

In some embodiments, the user interface 118 at the power tool 100 includes a button (e.g., a push button) configured to generate a spike or sudden increase in rotational speed of the device 200. In some embodiments of a method for operation, a user articulates the button to generate a sudden increase in rotational speed to cause line to feed, such as described herein. A first portion of the line may feed as the rotational speed increases and a second portion of the line may feed as the rotational speed decreases following the increased speed. The device 200 may return to a previous speed (i.e., before the spiked increase), such as corresponding to a throttle position by the user. The first portion of the line may correspond to approximately half of the line feed and the second portion of the line may correspond to approximately half of the line feed. In an exemplary embodiment, pressing the button to generate the spiked increase in rotational speed may dispense approximately one-sixth of a rotation of line from the spool. In an exemplary embodiment, each press of the button to generate the spiked increase in rotational speed may dispense approximately one-twelfth of a rotation of line as the first portion and one-twelfth of a rotation of lien as the second portion. In other embodiments, the power tool 100 or device 200 is configured to dispense, e.g., one-fifth of a rotation of line, or one-fourth of a rotation of line, or one-third of a rotation of line, or one-half of a rotation of line, or one-seventh of a rotation of line, or one-eighth of a rotation of line, etc., or other appropriate amount of rotation of line. Approximately half of the dispense line may be dispensed during speed increase and approximately half of the dispense line may be dispense during speed decrease based on stagger between lugs and stops.

In an embodiment of a method for operation, an operating cycle includes the plate 270 translating, via rotation of the flyweight 260 and pushing the plate 270 up (e.g., toward the first end 91) and returning down (e.g., toward the second end 92). The driven member 230 moves from one drive lug or detent 259 circumferentially to the next drive lug or detent 259. Each cycle feeds out a portion of the cutting line. In some embodiments, the driven member 230, the first lug 250, or both may include a quantity of detents 239, 259 corresponding to a portion of rotation of cutting line. For instance, the driven member 230, the first lug 250, or both, may include six detents 239, 259 each spaced apart in circumferential arrangement and corresponding to feeding one-sixth of a rotation of cutting line. It should be appreciated that other embodiments may include other quantities of detents 239, 259 corresponding to portions of rotation of cutting line, e.g., five detents 239, 259 corresponding to one-fifth of a rotation of cutting line, e.g., eight detents 239, 259 corresponding to one-eighth of a rotation of cutting line, etc. The length of the cutting line may change as cutting line is released from the spool 300 as an outer diameter of the spooled line decreases as cutting line is fed and used.

In some embodiments of a method for operation, the first operating range corresponds to an upper speed limit at which a user may normally cut or trim. The upper speed limit may correspond to power output from a motor or battery, durability, or may generally be understood in the art. The second operating range may include a lower limit that is above the upper speed limit. The second operating range may include an upper limit corresponding to a limit at which one or more components at the device, the power tool, or a motor may operate, or a power output, or one or more limits over a period of time.

FIG. 7 depicts exemplary directions of movement of the flyweight 260 when the lower limit at the second operating range is met or exceeded. At or greater than the lower limit, flyweight 260 rotates along the axis 94 extending through hinge 265, such as depicted schematically at arrow 267. In various embodiments, second portion 264 of flyweight 260 translates radially outward relative to the first axis 99, such as depicted at arrow 261. Rotation of the flyweight 260 causes first portion 262 to push onto plate 270, such as depicted at arrow 263. Below the lower limit, forces applied to the flyweight 260 are low enough such that second portion 264 does not substantially translate or cause first portion 262 to push or translate the platform 270. When the user decreases speed to below the lower limit, forces decrease allowing the flyweight 260 to move in directions opposite as depicted in FIG. 7.

In an exemplary embodiment, the upper speed limit at the first operating range is approximately 6000 revolutions per minute (RPM). The lower limit at the second operating range is greater than the upper speed limit, e.g., greater than 6000 RPM. The upper limit at the second operating range is at or below a speed at which one or more of the power tool, a motor, a battery or other power unit, or the device may operate. For instance, the upper limit may correspond to a speed below a power unit cutoff voltage. In other exemplary embodiments, the upper speed limit at the first operating range is greater than or less than 6000 RPM.

In some embodiments, the second operating range is at least approximately 10 RPM greater than the upper speed limit at the first operating range. In still some embodiments, the upper speed limit of the second operating range is up to approximately 1000 RPM greater than the upper speed limit at the first operating range. Accordingly, the second operating range may be between approximately 10 RPM and 1000 RPM greater than the upper limit at the first operating range.

Exemplary embodiments of the power tool 100 including the device 200 may be configured to include a first operating range, e.g., between zero RPM and approximately 6000 RPM. The first operating range corresponds to an operating speed for cutting grass, brush, flora, plant-life, etc. Within the first operating range, the driven member 230 is affixed or locked into place against the first lug 250. The power tool 100 including the user interface 118 allows a user to selectively operate the device 200 to increase the rotational speed to a second operating range greater, e.g., greater than 6000 RPM, or up to 6500 RPM, or up to 7000 RPM, etc. The power tool 100 may include a button at the user interface 118 configured to provide a burst, spike, or temporary increase in speed into the second operating range. At a threshold rotational speed (e.g., 6500 RPM), the flyweight 270 rotates along axis 94 and pushes the driven member 230 along the first axis 99 toward the first end 91. For instance, the flyweight 270 may rock out and push the driven member 230 to a top-most position of travel along the first axis 99. A force is generated onto the driven member 230 by the cutting line pulling on the driven member 230 as the cutting line egresses out of the housing 210. The force from the cutting line egressing the housing 210 rotates the driven member 230 until the driven member 230 reaches the detent 239, 259. As the speed burst decreases back down into the first operating range, the flyweight 270 rotates back along the axis 94 to allow the driven member 230 to translate down the first axis 99 toward the second end 92. In some embodiments, a spring 312 forces or biases the driven member 230 back down along the first axis 99 toward the second end 92, such as to position the driven member 230 into a bottom-most position. Continued pulling of the cutting line may further rotate the driven member 230 against the detent 239, 259.

Embodiments of the flyweight 260 may form a substantially L-shaped geometry, a V-shaped geometry, an arcuate geometry, or any other appropriate type of geometry. Various embodiments of the flyweight 260 may be configured to translate centrifugal forces (e.g., along second direction 98) into linear forces (e.g., co-directional to first axis 99). Embodiments of the flyweight 260 may be configured to translate centrifugal forces to linear forces at particular or desired ranges or thresholds of rotational speed of the device 200 (e.g., rotation around first axis 99).

In various embodiments, hinge 265 includes a pin, a housing, a body, or a mount at which the flyweight 270 may be positioned to support and allow rotation along axis 94 such as described herein.

Embodiments of the device 200 and power tool 100 depicted and described herein may mitigate undesired feeding of a wire or line, such as a trimmer line. Embodiments provided herein may mitigate or eliminate tangling, jamming, or waste by reducing undesired line feeding. Embodiments provided herein may provide one or more such benefits and advantages by providing structures and methods such as depicted and described herein, such as providing discrete or non-overlapping ranges, thresholds, or limits for the first operating range and the second operating range. Additionally, or alternatively, one or more such advantages described herein may be provided by structures and methods allowing for translation or lifting of the spool with speed increases, or furthermore, resetting of the spool with speed decreases. Such structures and methods may allow for commanding line feeding with an increase in rotational speed and un-commanding or discontinuing line feeding with a decrease in rotational speed.

Figure 11:
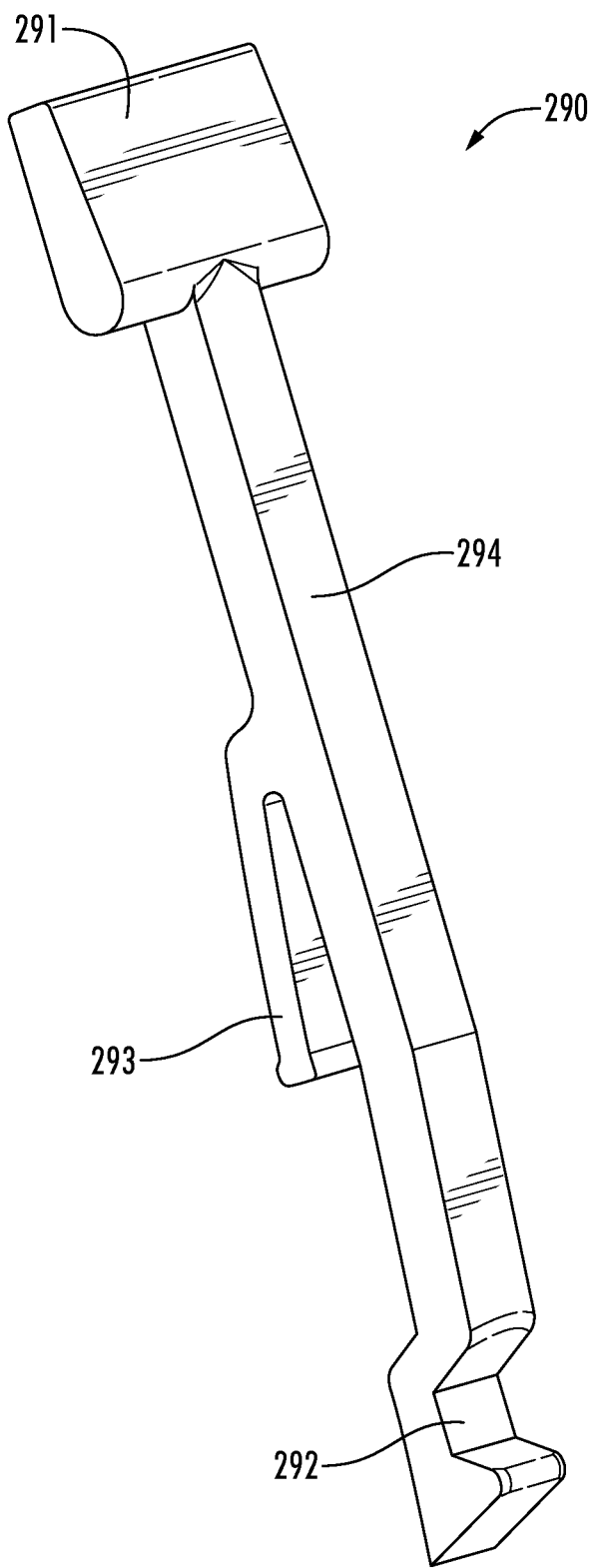
FIG. 11 depicts a perspective view of an exemplary embodiment of an arm of the accessory mount device in accordance with aspects of the present disclosure.

Referring now to FIG. 11, a perspective view of an embodiment an arm 290 is provided. The arm 290 may include a member 294 configured to extend substantially along the first axis 99. The arm 290 may include a tab 291 configured to position at an upper end of the member 294, such as proximate to the first end 91 when installed into the second housing 220. In some embodiments, the arm 290 is configured as a rigid structure. In exemplary embodiments, a spring is positioned behind the arm 290. For instance, the device 200 may include a pair of arms 290, such as depicted in the exploded view in FIG. 2. A spring may be positioned between the pair of arms 290, or positioned between the arm 290 and the centerbody 222 of the second housing 220. In still some embodiments, a springing structure 293 may extend from the member 294 to provide a return force to the member 294, a contact portion 292, and/or the tab 291. For instance, the springing structure 293 may contact the centerbody 222 at the second housing 220 to provide a return force to the arm 290. In some embodiments, the arm 290 may include one or more coil springs, leaf springs, torsion springs, or other appropriate type of spring structure. FIGS. 5-7 provide perspective views of embodiments of the device 200. FIG. 5 provides a partially exploded view of the device 200 and spool 300. FIG. 7 provides a perspective view including some components depicted transparent for clarity. FIGS. 5-7 may omit some components for clarity.

In still some embodiments, the arm 290 is configured as a spring-loaded arm extending into the device 200 from the second housing 220 and through the centerbody 222. The flyweight latch 280 is coupled in the device 200 to allow for rotation along a vertical axis substantially co-directional or parallel to the first axis 99. For instance, referring to FIGS. 3-4, a shaft or post 335 may extend along the first direction and into the flyweight latch 280. The post 335 may include a mechanical fastener, a shank, bolt, screw, tie rod, pin, or generally a shaft, or may include threads or other locking or fastening features. The flyweight latch 280 may form an opening 286 at which the post 335 is receivable. The opening 286 may form a sleeve, bushing, or other surface appropriate for allowing the flyweight latch 280 to rotate about an axis formed by the post 335 extending into the flyweight latch 280. In some embodiments, the opening 286 is formed at the flyweight latch 280 between a first portion 282 and a second portion 284.

Figure 12:
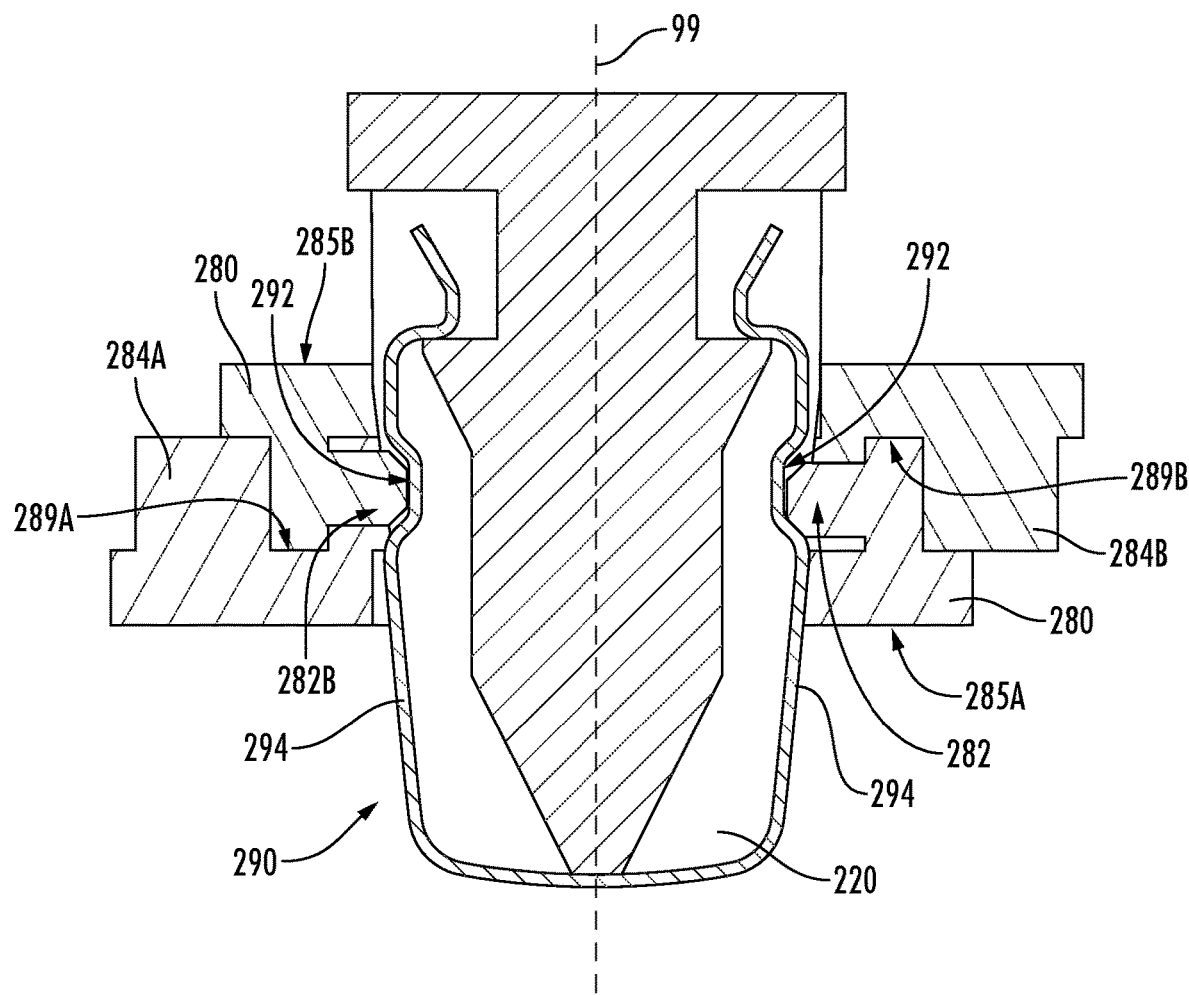
FIG. 12 depicts a cross-sectional side view of an exemplary embodiment of a portion of an accessory mount device in accordance with aspects of the present disclosure.

FIG. 12 depicts a schematic cross-sectional side view of a portion of an embodiment of the device 200 including the arm 290. In some embodiments, the arm 290 includes the member 294 extending substantially along the first axis 99. The arm 290 may form a contact portion 292 at which a flyweight latch 280 is configured to contact the arm 290. The contact portion 292 may form a recess, groove, lip, or detent at which the flyweight latch 280 contacts the arm 290.

Figure 13:
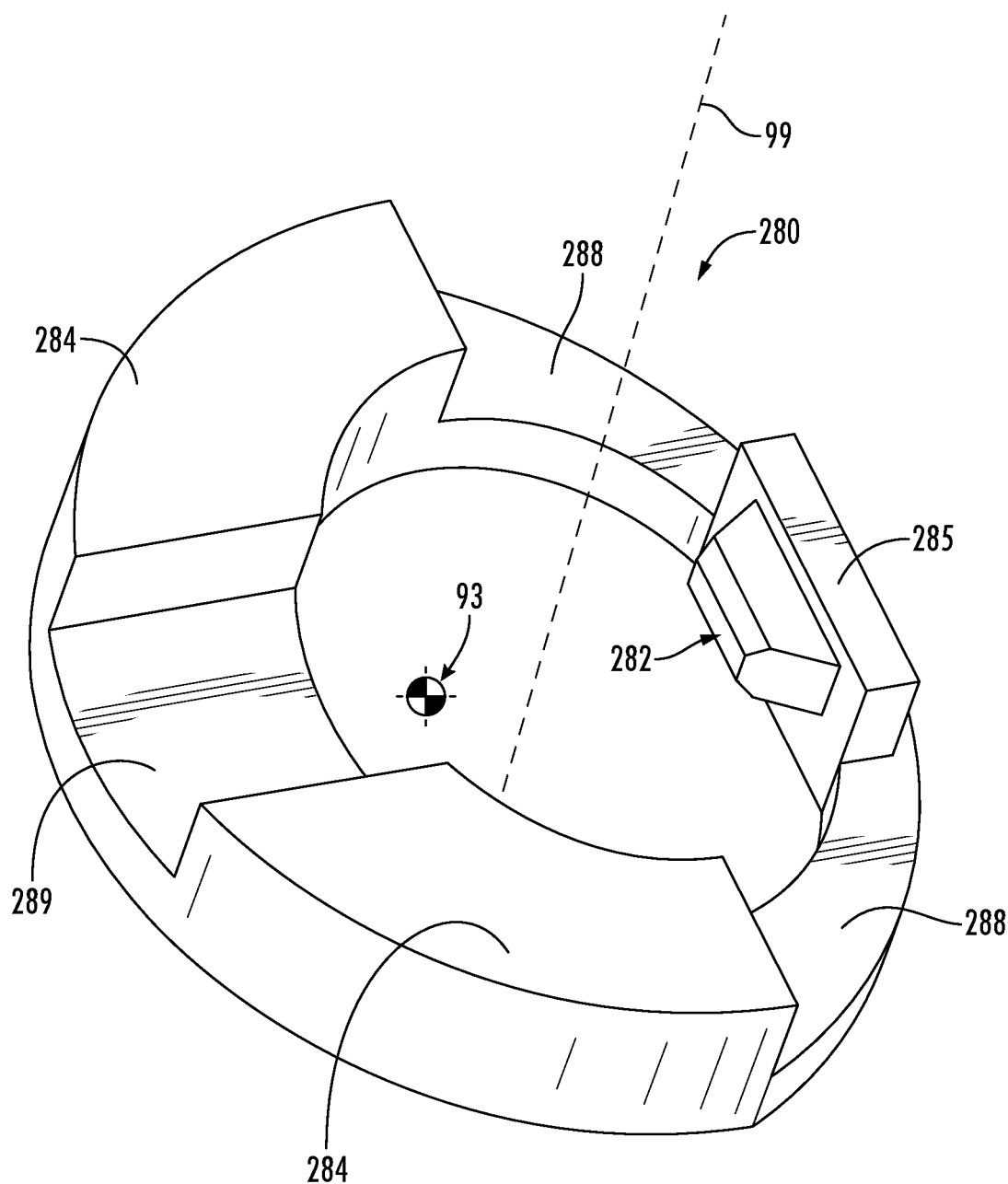

FIG. 13 depicts a perspective view of an exemplary embodiment of a flyweight latch 280. Referring to FIGS. 12-13, in some embodiments, the flyweight latch 280 includes a first portion 282 positioned to contact the contact portion 292 at the arm 290. The first portion 282 of the flyweight latch 280 may form a male connection slidable into the contact portion 292 of the arm 290 forming a female connection. The flyweight latch 280 is configured to have a center of mass, depicted schematically at point 93, off-center relative to the first axis 99. In some embodiments, such as depicted in FIG. 13, the flyweight latch 280 forms a ring structure. The first portion 282 forms a protrusion extending radially toward the first axis 99. The first portion 282 may extend from a wall 285 extending co-directional to the first axis 99. The second portion 284 may form castellations, teeth, or other interdigitatable structures. The flyweight latch 280 may form first surfaces 288 circumferentially adjacent to the first portion 282 and configured to receive the second portion 284 of another flyweight latch 280. The flyweight latch 280 may form second surface 289 circumferentially adjacent to the second portion 284 and configured to receive the first portion 282 of another flyweight latch 280.

Referring to FIG. 12, embodiments of the device 200 may include a first lower flyweight latch 280A and a second or upper flyweight latch 280B. The lower flyweight latch 280A forms a lower wall 285A configured to contact or mesh to an upper second surface 289B at the upper flyweight latch 290B. A lower first portion 282A extends from the lower wall 285A to contact the member 294 at a first contact portion 292A. The upper flyweight latch 280B forms an upper wall 285B configured to contact or mesh to a lower second surface 298A at the lower flyweight latch 290A. An upper first portion 282B extends from the upper wall 285B to contact the member 294 at a second contact portion 292B. The flyweight latches 280A, 280B mesh or interdigitate together, such as positioning a lower second portion 284A adjacent to the upper wall 285B and an upper second portion 284B adjacent to the lower wall 285A.

In some embodiments, the contact portions 292A, 292B are positioned radially opposed to one another. In still some embodiments, the center of mass 93 of respective flyweight latches 280A, 280B are positioned radially opposed to one another.

In an exemplary embodiment of a method for operation, the flyweight latches 280A, 280B form weighted rings including respective centers of mass 93 at opposing off-sets from the first axis 99. The user commands rotation of the device, such as described above (e.g., at the lower, first operating range or higher, second operation range). Masses at the flyweight latches 280A, 280B, such as at the second portions 284A, 284B, pull and tighten onto the centerbody 212, 222. The arm 290 may deform to an angle such that centerbody is inhibited from translating along the first direction co-directional to the first axis 99 until a rotational speed of the device 200 decreases to allow the arm 290 to return substantially to an initial form.

In an exemplary embodiment of a method for operation, the user commands rotation of the device, such as described above (e.g., at the lower, first operating range or higher, second operation range). Rotation of the device 200 generates centrifugal forces that cause the second portion 284 of the flyweight latch 280 to translate radially outward (e.g., away from the first axis 99). Translation of the second portion 284 forces the first portion 282 into the arm 290, such as at the contact portion 292.

FIG. 7 depicts exemplary directions of movement of the flyweight latch 280 when a first speed threshold is met or exceeded. At or greater than a first speed threshold, flyweight latch 280 rotates along an axis 96 (FIG. 4) extending through opening 286 (FIG. 6), such as depicted schematically at arrow 287. In various embodiments, second portion 284 of flyweight latch 280 translates radially outward relative to the axis extending through opening 286, such as depicted at arrow 281. Rotation of the flyweight latch 280 causes first portion 282 to extend or push into the contact portion 292 of arm 290, such as depicted at arrow 283. Below the first speed threshold, forces applied to the flyweight latch 280 are low enough such that second portion 284 does not substantially translate or cause first portion 282 to push into contact portion 292. When the user decreases speed to below the first speed threshold, forces decrease allowing the flyweight latch 280 to move in directions opposite as depicted in FIG. 7.

In some embodiments, an upper cap 340 may attach to the second housing 220. The upper cap 340 may be configured to surround the arm 290 along the first direction, such as to mitigate egress of the arm 290 from the second housing 220.

Embodiments of the device 200 including the arm 290 and flyweight latch 280 such as described herein may provide a locking system, such as to retain the second housing 220 to the first housing 210. Referring to FIG. 3, in some embodiments, the arm 290 extends through second housing 220 and selectively couples with the flyweight latch 280. The device 200 joins the first housing 210 to the second housing 220 through the arm 290 connected to the second housing 220 and coupled to the flyweight latch 280. The post 335 through the flyweight latch 280 may further extend through a retainer plate 320. A cap 330 may position onto the first housing 210, such as proximate to the second end 92 or distal to the second housing 220 along the first direction. The post 335 may extend through the cap 330, such as through a fastener opening 332 at the cap 330. The post 335 may compress the cap 330 to the first housing 210 and secure the retainer plate 320 at the first housing 210. The flyweight latch 280 secured by the post 335 may provide desired coupling of the first housing 210 to the arm 290 and second housing 220. Embodiments of the locking system may provide relatively quick release, assembly, and disassembly of one or more housings 210, 220, such as to allow access to change and replace the spool 300.

Referring still to FIG. 3, in some embodiments, the second housing 220 forms a second radial end 224 extending along the second direction 98. The first housing 210 forms a first radial end 214 extending along the second direction 98. The second radial end 224 extends further along the second direction 98 than the first radial end 214. In some embodiments, the first radial end 214 extends along second direction 98 greater than the opening 216 formed through an outer wall of the first housing 210. The second radial end 224 may prevent the outer wall of the first housing 210 from contacting a substantially flat surface (e.g., curb, wall, ground, etc.). Accordingly, line feeding from the opening 216 (FIG. 2) may be mitigated from breakage or shearing, such as to improve durability and longevity of trimmer line during operation of the power tool.

Figure 14:
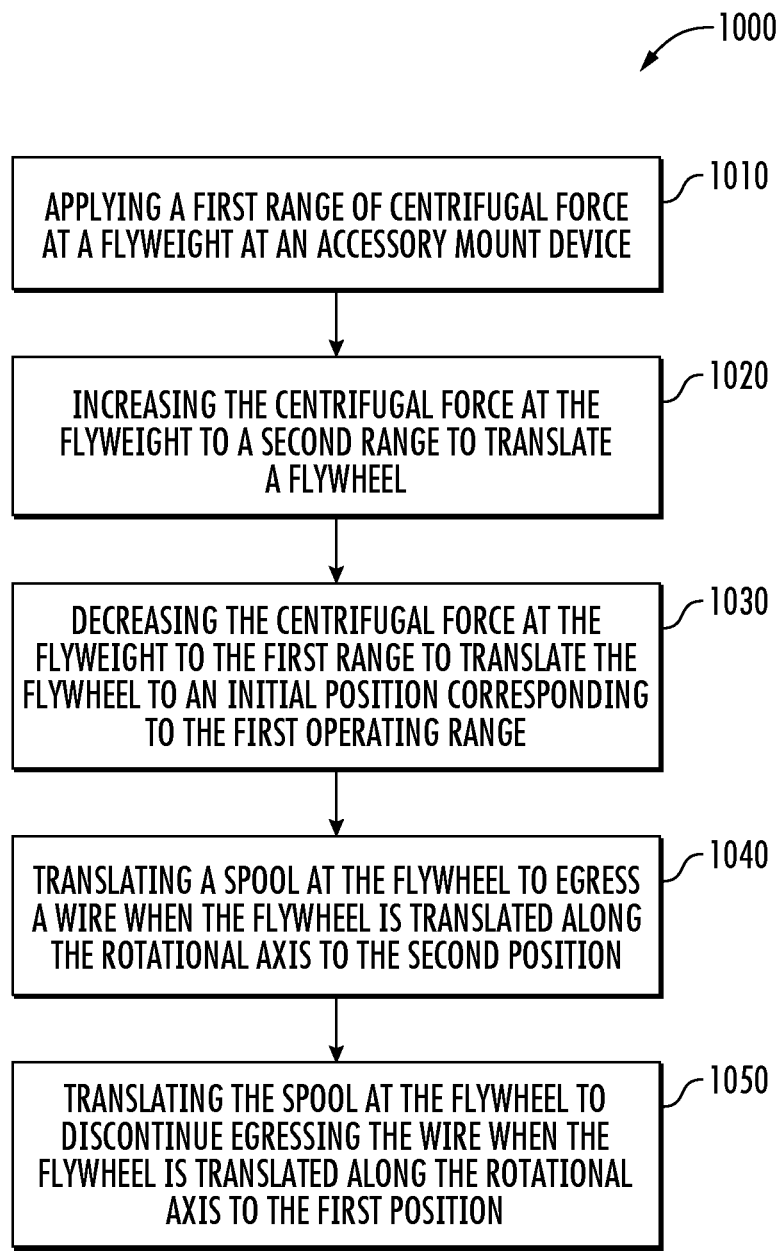
FIG. 14 provides a flowchart outlining steps of a method for operating a power tool in accordance with aspects of the present disclosure.

Referring now to FIG. 14, a flowchart outlining steps of a method for operation of a power tool is provided (hereinafter, "method 1000"). Embodiments of the method 1000 may include steps, functions, or operations such as depicted and described herein in regard to FIGS. 1-11. Some embodiments of the method 1000 may include methods for operating a trimmer tool (e.g., power tool 100) to selectively egress wire or line from a trimmer head (e.g., trimmer head 102). In other embodiments, method 1000 may include methods for operating a spool (e.g., spool 300) to selectively egress wire or line from an accessory mount device (e.g., device 200). It should be appreciated that embodiments of the device 200 and method 1000 provided herein may be applied generally to wire or line feed spool devices positioned within rotatable structures (e.g., housing 210, 220).

Method 1000 includes at 1010 applying a first range of centrifugal force at a flyweight (e.g., flyweight 260) at an accessory mount device (e.g., device 200). The first range of centrifugal force corresponds to rotating the accessory mount device in a first operating range, such as described above.

Method 1000 includes at 1020 increasing the centrifugal force at the flyweight to a second range to translate or push a driven member (e.g., driven member 230) along a rotational axis of the accessory mount device from a first position to a second position. The second range of centrifugal force corresponds to rotating the accessory mount device in a second operating range, such as described above.

In some embodiments, method 1000 includes at 1030 decreasing the centrifugal force at the flyweight to the first range to translate the driven member to an initial position corresponding to the first operating range.

In still some embodiments, method 1000 includes at 1040 translating a spool (e.g., spool 300) at the driven member to egress a wire when the driven member is translated along the rotational axis to the second position.

In still yet some embodiments, method 1000 includes at 1050 translating the spool at the driven member to discontinue egressing the wire when the driven member is translated along the rotational axis to the first position.

Figure 15:
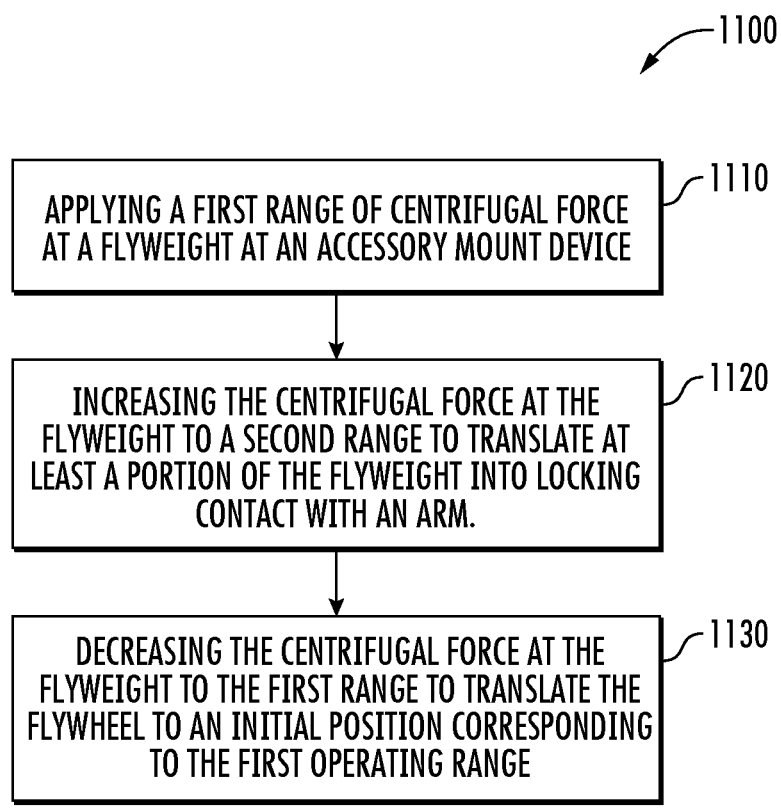
FIG. 15 provides a flowchart outlining steps of a method for locking a housing of an accessory mount device in accordance with aspects of the present disclosure.

Referring now to FIG. 15, a flowchart outlining steps of a method for locking a housing for an accessory mount device is provided (hereinafter, "method 1100"). Embodiments of the method 1000 may include steps, functions, or operations such as depicted and described herein in regard to FIGS. 1-11.

Method 1100 includes at 1110 applying a first range of centrifugal force at a flyweight (e.g., flyweight latch 280) at an accessory mount device (e.g., device 200). The first range of centrifugal force corresponds to rotating the accessory mount device in a first operating range, such as described above.

Method 1100 includes at 1120 increasing the centrifugal force at the flyweight to a second range to translate at least a portion of the flyweight into locking contact with an arm. The second range of centrifugal force corresponds to rotating the accessory mount device in a second operating range, such as described above. In some embodiments, translating the flyweight into locking contact with the arm includes compressing at least a portion of the arm toward the rotational axis (e.g., first axis 99) of accessory mount device. In still some embodiments, compressing at least a portion of the arm includes clamping the arm and the housing (e.g., housing 220) to one another. In still yet some embodiments, compressing at least a portion of the arm includes clamping an upper housing (e.g., housing 220) and a lower housing (e.g., housing 210) together.

In some embodiments, method 1100 includes at 1130 decreasing the centrifugal force at the flyweight to the first range to translate the driven member to an initial position corresponding to the first operating range. In still some embodiments, translating the driven member to the initial position decreases or decompresses at least a portion of the arm.

Further steps of the method 1000, 1100 may be understood from descriptions and depictions of exemplary operation of the embodiments of the device 200 or power tool 100 such as provided herein.

It should be appreciated that the first operating range of method 1000 may correspond to the first operating range of method 1100. The second operating range of method 1000 may correspond to the second operating range of method 1100. In some embodiments, the operating ranges may be separate from one another, such as based on different configurations of flyweight 260 and flyweight latch 280. For instance, the flyweight latch 280 may be configured to translate into locking position at a lower rotational speed than the flyweight 260 configured to translate to push the driven member 230 and spool 300. In another instance, the flyweight latch 280 may be configured to translate into locking position at a rotational speed corresponding to a lower limit at which a trimmer head may be configured to cut or trim.

Further aspects of the invention are provided by the subject matter of the following clauses:

1. An accessory mount device for a power tool, the device defining a first axis around which the device is rotatable and a first direction co-directional to the first axis, the device defining a first end and a second end separated along the first axis, and the device defining a second direction extending radially from the first axis, the device including a driven member, a plate, and a flyweight including a first flyweight portion configured to translate along the first direction and contact the plate, the flyweight including a second flyweight portion configured to translate along the second direction, wherein the flyweight is positioned at a hinge between the first flyweight portion and the second flyweight portion, and wherein the flyweight is configured to rotate along the hinge to push the first flyweight portion to the plate and translate the plate and the driven member along the first direction toward the first end when a rotational speed threshold about the first axis is exceeded.
2. The accessory mount device of any one or more clauses herein, wherein the second flyweight portion of the flyweight forms a counterweight to the first flyweight portion of the flyweight.
3. The accessory mount device of any one or more clauses herein, the device including a first lug; and a second lug, wherein the first lug and the second lug form an interdigitated structure extending into one another.
4. The accessory mount device of any one or more clauses herein, wherein the driven member forms a driven member detent extending inward along the second direction toward the first axis, and wherein the driven member detent is configured to abut a first lug detent extending outward along the second direction.
5. The accessory mount device of any one or more clauses herein, wherein the first lug and the second lug form substantially star-shaped structures.
6. The accessory mount device of any one or more clauses herein, wherein the interdigitated structure includes respective interfaces at the first lug and the second luge forming castellations.
7. The accessory mount device of any one or more clauses herein, wherein a detent structure extends from the second lug into opening formed at the first lug.
8. The accessory mount device of any one or more clauses herein, wherein the first lug and the second lug are positioned within the driven member and above the plate along the first direction.
9. The accessory mount device of any one or more clauses herein, the flyweight forming a substantially L-shaped, V-shaped, or arcuate geometry.
10. The accessory mount device of any one or more clauses herein, the device including a lower housing into which the driven member, the plate, and the flyweight is disposed, the lower housing forming a centerbody extending along the first direction; and a spring extending around the centerbody at the housing, wherein the lower housing contacts the spring to provide an opposing force along the first direction relative to the flyweight pushing the plate along the first direction.
11. The accessory mount device of any one or more clauses herein, the device including an upper housing forming a centerbody extending along the first direction; a spring extending along the first direction through the centerbody at the upper housing; and a flyweight latch configured to translate substantially along the second direction when a threshold speed about the first axis is exceeded.

12. The accessory mount device of any one or more clauses herein, the device including a post extending along the first direction, wherein the flyweight latch is rotatably coupled to the fastener to allow the flyweight latch to translate substantially along the second direction.
13. The accessory mount device of any one or more clauses herein, the device including a cap coupled to a lower housing, wherein the fastener extends through the cap, and wherein the spring couples to the flyweight latch, and wherein coupling of the spring and the flyweight latch retains the upper housing to the lower housing.
14. The accessory mount device of any one or more clauses herein, wherein the spring includes a contact portion at which the flyweight latch contacts the spring when translated substantially along the second direction.
15. The accessory mount device of any one or more clauses herein, the flyweight latch including a first latch portion having a lower mass than a second latch portion, wherein the first latch portion is configured to contact the spring at the contact portion.
16. A power tool, the power tool including a power tool housing including a port configured to be electrically connected with a power source; a trimmer head electrically connected to the power source to rotate the trimmer head, the trimmer head defining a first axis around which the trimmer head is rotatable and a first direction co-directional to the first axis, the trimmer head defining a first end and a second end separated along the first axis, and the trimmer head defining a second direction extending radially from the first axis, the trimmer head including a driven member, a plate, a flyweight including a first flyweight portion configured to translate along the first direction and contact the plate, the flyweight including a second flyweight portion configured to translate along the second direction, wherein the flyweight is positioned at a hinge between the first flyweight portion and the second flyweight portion, and wherein the flyweight is configured to rotate along the hinge to push the first flyweight portion to the plate and translate the plate and the driven member along the first direction toward the first end when a rotational speed threshold about the first axis is exceeded.
17. The power tool of any one or more clauses herein, the trimmer head including a first lug; and a second lug, wherein the first lug and the second lug form an interdigitated structure extending into one another.
18. The power tool of any one or more clauses herein, the trimmer head including an upper housing forming a centerbody extending along the first direction; a spring extending along the first direction through the centerbody at the upper housing; and a flyweight latch configured to translate substantially along the second direction when a threshold speed about the first axis is exceeded.
19. A method for operating a power tool, the method including applying a first range of centrifugal force at a flyweight at an accessory mount device, wherein the first range of centrifugal force corresponds to rotating the accessory mount device in a first operating range; and increasing the centrifugal force at the flyweight to a second range of centrifugal force to translate a driven member along a rotational axis of the accessory mount device from a first position to a second position, wherein the second range of centrifugal force corresponds to rotating the accessory mount device in a second operating range.
20. The method of any one or more clauses herein, wherein the first operating range and the second operating range are non-overlapping.
21. The method of any one or more clauses herein, the method including decreasing the centrifugal force at the flyweight to the first range to translate the driven member to an initial position corresponding to the first operating range.
22. The method of any one or more clauses herein, the method including translating a spool at the driven member to egress a wire when the driven member is translated along the rotational axis to the second position.
23. The method of any one or more clauses herein, wherein the first position is a non-egressing position of the wire.
24. The method of any one or more clauses herein, the method including translating the spool at the driven member to discontinue egressing the wire when the driven member is translated along the rotational axis to the first position.
25. A method for locking a housing for an accessory mount device, the method including applying a first range of centrifugal force at a flyweight at an accessory mount device, wherein the first range of centrifugal force corresponds to rotating the accessory mount device in a first operating range.
26. The method of any one or more clauses herein, the method including increasing the centrifugal force at the flyweight to a second range to translate at least a portion of the flyweight into locking contact with a spring.
27. The method of any one or more clauses herein, wherein the second range of centrifugal force corresponds to rotating the accessory mount device in a second operating range.
28. The method of any one or more clauses herein, wherein translating the flyweight into locking contact with the spring includes compressing at least a portion of the spring toward the rotational axis of accessory mount device.
29. The method of any one or more clauses herein wherein compressing at least a portion of the spring includes clamping the spring and the housing to one another.
30. The method of any one or more clauses herein, wherein compressing at least a portion of the spring includes clamping an upper housing and a lower housing together.
31. The method of any one or more clauses herein, the method including decreasing the centrifugal force at the flyweight to the first range to translate the driven member to an initial position corresponding to the first operating range.
32. The method of any one or more clauses herein, wherein translating the driven member to the initial position decreases or decompresses at least a portion of the spring.
33. A power tool configured to perform the method of any one or more clauses herein.
34. An accessory mount device configured to perform the method of any one or more clauses herein.

35. An accessory mount device for a power tool, the device including an upper housing forming a centerbody extending along a first direction; a spring extending along the first direction through the centerbody at the upper housing; and a flyweight latch configured to translate substantially along a second direction when a threshold speed about the first axis is exceeded.

36. The accessory mount device of any one or more clauses herein, the device including a post extending along the first direction, wherein the flyweight latch is rotatably coupled to the fastener to allow the flyweight latch to translate substantially along the second direction.

37. The accessory mount device of any one or more clauses herein, the device including a cap coupled to a lower housing, wherein the fastener extends through the cap, and wherein the spring couples to the flyweight latch, and wherein coupling of the spring and the flyweight latch retains the upper housing to the lower housing.

38. The accessory mount device of any one or more clauses herein, wherein the spring includes a contact portion at which the flyweight latch contacts the spring when translated substantially along the second direction.

39. The accessory mount device of any one or more clauses herein, the flyweight latch including a first latch portion having a lower mass than a second latch portion, wherein the first latch portion is configured to contact the spring at the contact portion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An accessory mount device for a power tool, the device defining a first axis around which the device is rotatable and a first direction co-directional to the first axis, the device defining a first end and a second end separated along the first axis, and the device defining a second direction extending radially from the first axis, the device comprising:
   a driven member;
   a plate;
   an upper housing comprising a centerbody extending along the first direction;
   a spring extending along the first direction through the centerbody at the upper housing;
   a flyweight comprising a first flyweight portion configured to translate along the first direction and contact the plate, the flyweight comprising a second flyweight portion configured to translate along the second direction, wherein the flyweight is positioned at a hinge between the first flyweight portion and the second flyweight portion, and wherein the flyweight is configured to rotate along the hinge to push the first flyweight portion to the plate and translate the plate and the driven member along the first direction toward the first end when a rotational speed threshold about the first axis is exceeded; and
   a flyweight latch configured to translate substantially along the second direction when a threshold speed about the first axis is exceeded.

2. The accessory mount device of claim 1, wherein the second flyweight portion comprises a counterweight to the first flyweight portion.

3. The accessory mount device of claim 1, the device comprising:
   a first lug; and
   a second lug, wherein the first lug and the second lug comprise an interdigitated structure extending into one another.

4. The accessory mount device of claim 3, wherein the driven member comprises a driven member detent extending inward along the second direction toward the first axis, and wherein the driven member detent is configured to abut a first lug detent extending outward along the second direction.

5. The accessory mount device of claim 3, wherein the first lug and the second lug comprise substantially star-shaped structures.

6. The accessory mount device of claim 3, wherein the interdigitated structure comprises respective interfaces at the first lug and the second lug comprising castellations.

7. The accessory mount device of claim 3, wherein a detent structure extends from the second lug into an opening at the first lug.

8. The accessory mount device of claim 3, wherein the first lug and the second lug are positioned within the driven member and above the plate along the first direction.

9. The accessory mount device of claim 1, the flyweight comprising a substantially L-shaped, V-shaped, or arcuate geometry.

10. The accessory mount device of claim 1, the device comprising:
    a lower housing into which the driven member, the plate, and the flyweight are disposed, the lower housing comprising a centerbody extending along the first direction; and
    a spring extending around the centerbody at the housing, wherein the lower housing contacts the spring to provide an opposing force along the first direction relative to the flyweight pushing the plate along the first direction.

11. The accessory mount device of claim 1, the device comprising:
    a post extending along the first direction, wherein the flyweight latch is rotatably coupled to the post to allow the flyweight latch to translate substantially along the second direction.

12. The accessory mount device of claim 11, the device comprising:
    a cap coupled to a lower housing, wherein the post extends through the cap, and wherein the spring couples to the flyweight latch, and wherein coupling of the spring and the flyweight latch fixedly retains the upper housing to the lower housing.

13. The accessory mount device of claim 1, wherein the spring comprises a contact portion at which the flyweight latch contacts the spring when translated substantially along the second direction.

14. The accessory mount device of claim 1, the flyweight latch comprising a first latch portion having a lower mass than a second latch portion, wherein the first latch portion is configured to contact the spring at a contact portion.

15. A power tool, the power tool comprising:
a power tool housing including a port configured to be electrically connected with a power source;
a trimmer head electrically connected to the power source to rotate the trimmer head, the trimmer head defining a first axis around which the trimmer head is rotatable and a first direction co-directional to the first axis, the trimmer head defining a first end and a second end separated along the first axis, and the trimmer head defining a second direction extending radially from the first axis, the trimmer head comprising:
a driven member;
a plate;
an upper housing comprising a centerbody extending along the first direction;
a spring extending along the first direction through the centerbody at the upper housing;
a flyweight comprising a first flyweight portion configured to translate along the first direction and contact the plate, the flyweight comprising a second flyweight portion configured to translate along the second direction, wherein the flyweight is positioned at a hinge between the first flyweight portion and the second flyweight portion, and wherein the flyweight is configured to rotate along the hinge to push the first flyweight portion to the plate and translate the plate and the driven member along the first direction toward the first end when a rotational speed threshold about the first axis is exceeded; and
a flyweight latch configured to translate substantially along the second direction when a threshold speed about the first axis is exceeded.

16. The power tool of claim 15, the trimmer head comprising:
a first lug; and
a second lug, wherein the first lug and the second lug form an interdigitated structure extending into one another.

* * * * *